United States Patent [19]
Schneider

[11] 3,768,625
[45] Oct. 30, 1973

[54] CONVEYOR SYSTEM
[76] Inventor: Erich Schneider, Sterneckberg 15, Wiesensteig, Wurttemberg, Germany
[22] Filed: Dec. 21, 1971
[21] Appl. No.: 210,429

[52] U.S. Cl. .................... 198/20, 198/78, 198/165
[51] Int. Cl. ... B65g 47/00, B65g 37/00, B65g 15/14
[58] Field of Search ............... 198/31 AC, 160, 165, 198/162, 38, 78, 20

[56] References Cited
UNITED STATES PATENTS
3,612,249  10/1971  Schneider ........................ 198/165
3,266,626  8/1966  Simjian ........................ 198/31 AC FOREIGN PATENTS OR APPLICATIONS
1,262,890  3/1968  Germany ........................ 198/165

Primary Examiner—Richard E. Aegerter
Attorney—Lewis H. Eslinger et al.

[57] ABSTRACT

A conveyor system is disclosed for transporting articles to preselected destinations, in which a generally horizontal conveyor having forward and return runs is located between synchronously moving endless conveyor belts defining vertically moving upward and downward conveyor flights therebetween. Each article is provided with a destination address and means are provided between the forward and return runs of the horizontal conveyor for diverting an article moving downwardly between the downward runs of the vertical conveyors to either the forward or return run of the horizontal conveyor, in response to the destination address on the article. In addition, a lifting conveyor is provided adjacent one of the runs of the horizontal conveyor to lift an article located on that run to the upwardly moving flights of the vertical conveyors.

8 Claims, 4 Drawing Figures

CONVEYOR SYSTEM

The present invention relates to a conveyor system, and more particularly to a conveyor belt installation for transporting containers provided with destination addresses between a horizontal conveyor and pairs of cooperating endless conveyors having flights moving in vertical and downward directions.

In many applications it is necessary to transport articles or containers, from vertically moving conveyors to horizontally moving conveyors or vice versa. This procedure is exceedingly difficult with articles which are open at the top, such as for example, containers which are intended for use in containing documents. In many installations which have previously been proposed, the difficulties occurring with such containers can be overcome only by means of elaborate constructions which are expensive and time consuming to construct and have disadvantageous and obstructing effects during the operation of the conveyor system. In many conveyor systems, a number of peripheral horizontal conveyors are used at the initiation point of the conveying process. From these peripheral conveyors, it is typical for the article to move from the horizontal conveyor to a downwardly or upwardly moving vertical conveyor for distribution through the building by the conveyor system. The vertically moving conveyors are conventionally formed by a pair of endless conveyors with adjacent flights moving in the same direction, with the container held therebetween. Typically, the belts are guided by a plurality of movably mounted rollers in order to receive and move the containers or articles therebetween.

At the end of a downward run the transported container is passed to a flight of a horizontal conveyor and moved out from below the downwardly moving conveyor. However, if the container is to be moved to a point of delivery on an upper floor in the installation it must be moved to a position adjacent a vertically moving conveyor. To accomplish this, with previously proposed systems, the container delivered to the horizontal conveyor is moved along the horizontal run of the conveyor in a reversing loop, that is, 180° around the conveyor, so that it is ultimately moved to the opposite side of the conveyor beneath the upward run of the vertically moving conveyor line. From there the container is then carried to the desired floor, placed on yet another horizontal conveyor and delivered to its destination. It is clear that with installations of this kind, a considerable amount of idle running of the conveyor system is required. This time and the excess cost of running the equipment in order to move the articles 180° about the horizontal conveyor is a serious disadvantage in such systems.

Accordingly, it is an object of the present invention to overcome the above-described problems by a conveyor system which is relatively simple and inexpensive in operation.

Yet another object of the present invention is to provide a conveyor system wherein articles can be readily diverted from a downwardly moving conveyor flight to an upwardly moving conveyor in accordance with a predetermined address provided on the article itself.

Yet another object of the present invention is to provide a conveyor system wherein an article being conveyed from a downwardly moving conveyor to a horizontally moving conveyor can be selectively diverted to either of the horizontally moving flights thereof.

Yet another object of the present invention is to provide a conveyor system which is of relatively simple construction and inexpensive to manufacture.

The problem underlying the present invention, as is evident from the prior art, consists in providing a relatively simple construction by which to direct selective transfer of articles being conveyed between vertical and horizontal conveyors. In accordance with the present invention this is achieved by providing, in the region of the lower end of a pair of vertically moving conveyor flights, between the two flights of the horizontal conveyor therebelow, a guide flap which is controlled in response to the destination address on the article so that it selectively diverts containers or articles to be transported to one or the other of the horizontal conveyor flights. In addition, by directly moving the article to one of the conveyors, the article can be directly diverted to the upwardly moving conveyor of the system. This is accomplished by means of a lifting conveyor located adjacent the horizontal conveyor and having an upwardly moving flight portion with means mounted on the conveyor for engaging an article on the horizontal conveyor and lifting it from the horizontal conveyor to a position wherein it is engaged between the upwardly moving flights of the vertical conveyor system.

As a result, a container or article can now be passed not only from a downward run of the vertical conveyor system to the forward or return runs of the horizontal conveyor therebelow, but also can be diverted from the downward run of the vertical conveyor system to the upward run of the vertical conveyor system without the necessity of the article being transported completely around the horizontal conveyor.

The above, and other objects, features and advantages of this invention, will be apparent in the following detailed description of an illustrative embodiment thereof which is to be read in connection with the accompanying drawings, wherein.

Figure 1:
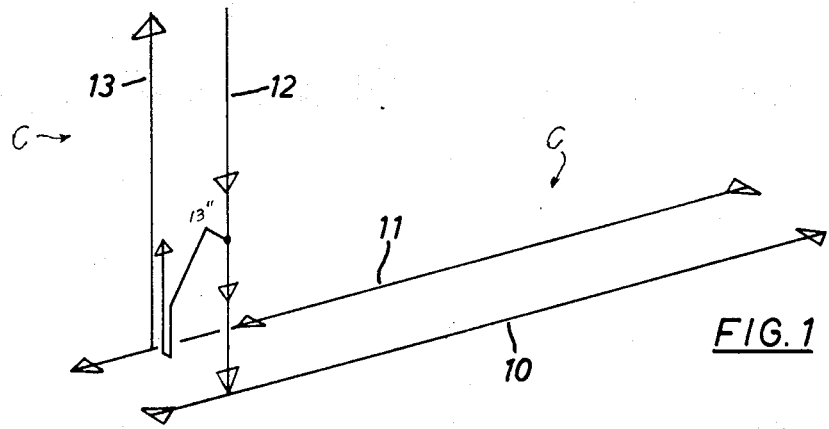
FIG. 1 is a schematic illustration of a conveyor system constructed in accordance with the present invention.

Referring to the drawings in detail, and initially to FIG. 1, it is seen that a generally endless horizontal conveyor C, of conventional construction, is provided having flights 10 and 11 moving in opposite directions, hereinafter referred to respectively as the forward and return runs of the conveyor. In addition, a vertical conveyor system C' is provided which is adapted to move an article along a downward path 12, to the forward run of the conveyor 10, or from the return run 11 of the conveyor, along an upward path 13.

In accordance with the present invention, a system is provided for moving an article directly from the downward path of travel 12 in the direction indicated by the line 13'' to the upward direction of travel 13 of the vertical conveyor system C'.

The article or container 14 to be transported by the conveyor system of the present invention is provided on one or both of its sides with a destination address in the form of adjustable contact bridges secured to the containers, which bridges are of well known and conventional construction. These contact bridges are sensed along their transport path, by stationary interrogation heads 15 (FIG. 3) which detect the destination address on the bridge and activate an electrical system for controlling the various components of the invention. It is noted that the address system can be of other conventional construction, as for example, can be magnetic recorded signals applied to the article and the interrogation heads 15 may be electromagnetic pickup heads, as would be obvious to one skilled in the art. The control mechanism and drive system for the conveyor system of the present invention, or the various parts thereof, would be clear to one skilled in the art after a careful consideration of the structure and sequence of operation of the invention as described hereinafter.

Figure 2:
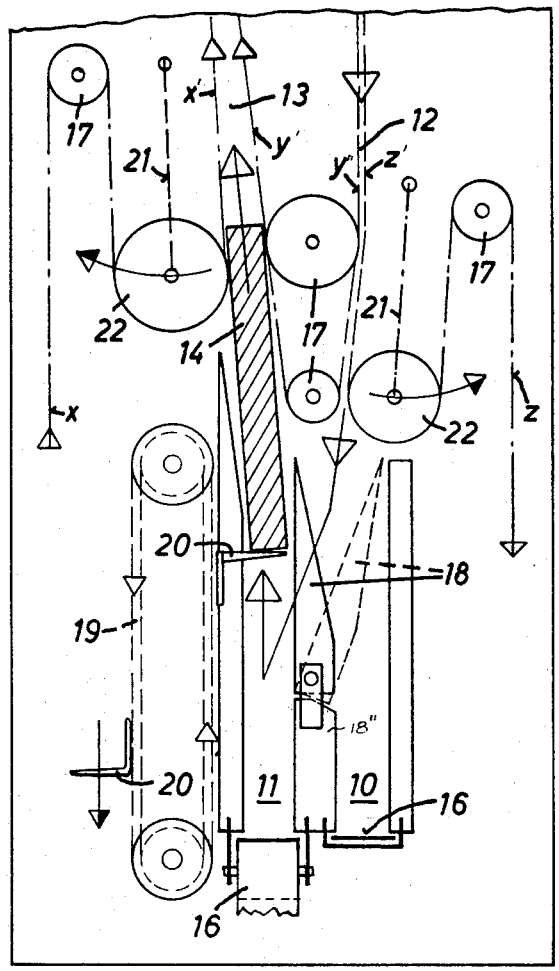
FIG. 2 is a schematic end view of a conveyor system constructed in accordance with the present invention, showing portions of the various conveyors and the article being lifted from the horizontal conveyor to the vertically moving conveyor of the system.
Figure 3:
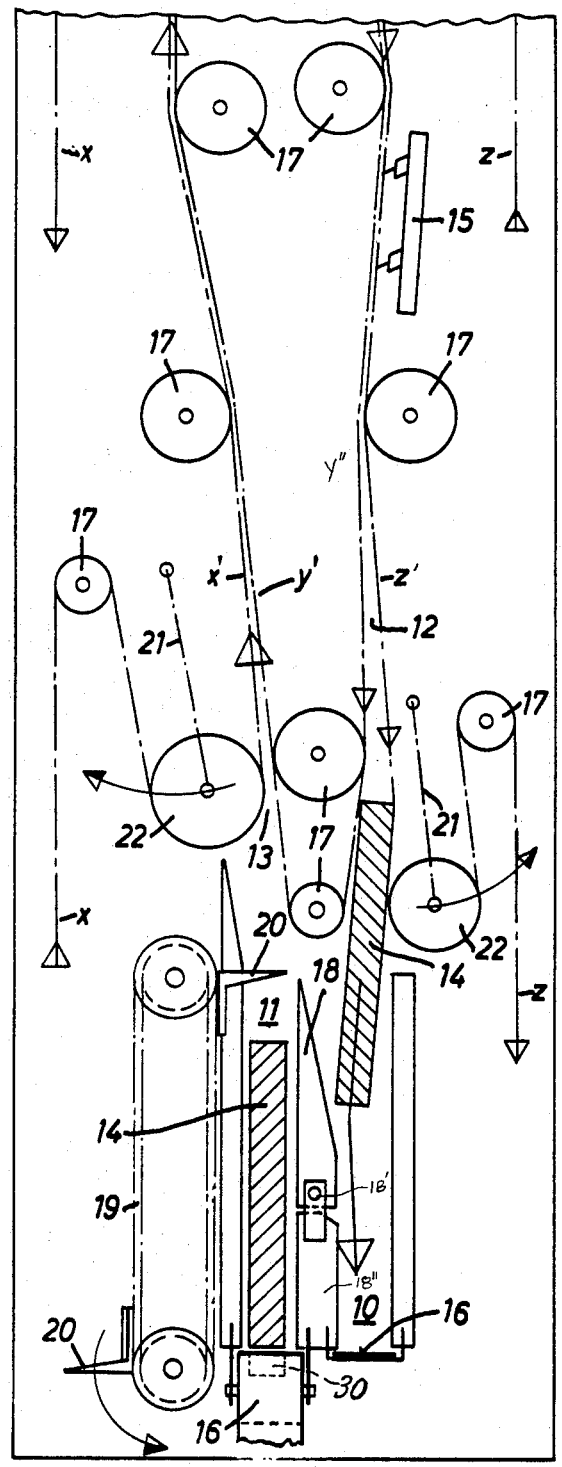
FIG. 3 is a view similar to FIG. 2 showing a container passing from the downwardly moving flights of the conveyor system to the horizontal conveyor.

Referring to FIGS. 2 and 3, it is seen that conveyor paths 10 and 11 are defined by a horizontally moving conveyor 16 located at the bottom of the conveyor system. The vertical conveyor system C' is defined by three endless conveyors X, Y and Z, (only portions of which are illustrated in the drawing) driven in a conventional manner so that the conveyor flights X', Y', move upwardly adjacent each other in synchronization while the conveyor flights Y'' and Z' move downwardly in synchronization. These conveyors are guided over rollers 17 during the operation of the device to assure an accurate and aligned guide path therefor. In addition, conventional spring biased belt tighteners 21, having rollers 22 engaged with the respective belts, are provided in order to maintain an accurate tensioning of the conveyors, thereby assuring proper operation of the device and engagement of the articles to be transported. It is thus seen that the conveyor flights X', Y', and Y'', Z', define the upwardly and downwardly moving conveyor paths 13, 12, respectively.

A diverter mechanism 18 is located between conveyor flight paths 10, 11 of conveyor C. The diverter 18 comprises a plate or tongue which is pivotally mounted at 18' on the support frame 18'' of the apparatus. Plate 18 is adapted to be moved, through a simple mechanical drive system, under the control of the pickup or interrogation heads 15, as heretofore described, between the vertical position illustrated in solid lines in FIGS. 2 and 3 and the position shown in dotted lines in FIG. 2. In this manner, an article 14 moving downwardly along the conveyor path 12, between conveyor flights Y'', Z' will be selectively placed on either the forward path 10 of conveyor 16 or the return path 11 thereof, in accordance with the destination address previously applied to the article. If the article is placed on forward path or flight 10, it can be brought to a destination on the same floor, or transferred manually or otherwise to another set of downwardly moving conveyors. On the other hand, if the article's destination address indicates that the article is to be moved upwardly to another floor, the plate 18 moves to a dotted line position, so that the article moves in the path of the arrows indicated in FIG. 2 into conveyor path 11 and onto conveyor 16.

In order to transfer the article 14 from conveyor 16 to the upwardly moving conveyor path 13, a lifting conveyor 19 is provided which lifts the article 14 from conveyor 16 and raises it to the gap between the conveyor flights X', Y', indicated at the location of numeral 13 in FIG. 3, so that the article is engaged between conveyor flights X', Y' and carried therebetween upwardly to the above floors. In one embodiment, conveyor 19 is activated only when the appropriate address is read by interrogation head 15. If the destination address on the article does not indicate that the article is to be raised to conveyor path 13, conveyor 19, more fully described hereinafter, is not activated and the article 14 moves along flight 11 to the designated location.

Figure 4:
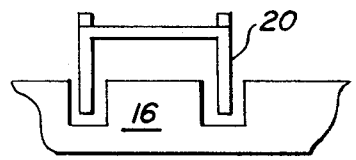
FIG. 4 is a partial plan view of a portion of the conveyor system shown in FIG. 2.

Conveyor 19 is located adjacent conveyor flight 11 at the transition point adjacent the diverter 18. This conveyor consists of at least two parallelly mounted endless chains which are synchronously driven and have a pair of carrying forks or plates 20 mounted therebetween. The plates 20 extend outwardly from the conveyors and are located at opposite ends thereof so as to be half a revolution of the conveyor chain apart. As seen in FIG. 4, conveyor 16 may have apertures therein through which the forks or plates 20 pass in order to engage the bottom of an article located adjacent the lifting conveyor. Alternatively, the conveyor 16 may be diverted in a sinuous path adjacent conveyor 19, so that the fingers 20 can pass freely between the loops in the conveyor. However, such loops would be sufficiently close together so that the article 14 would be stably supported in a horizontal position as it passes conveyor 19. In this manner it is seen that the conveyor, if operated in accordance with the address designation recorded on the article, will be moved in the direction of the arrow indicated in FIG. 3 in a generally counterclockwise direction so that the fingers 20 thereof will engage the bottom of article 14 and lift it upwardly to a position between the conveyor flights X', Y', wherein it is engaged thereby and carried upwardly therebetween. The deflector rollers or idler pulleys 22 are swiveled against the actions of a spring (not shown), in a conventional manner, to permit the article to be grasped between the conveyor flights and to maintain sufficient tension on the conveyor so that the article is held therebetween as the conveyor is moved upwardly.

In another embodiment of the present invention, the conveyor 19 can be separately controlled, rather than being controlled by the pickup heads 15. In this embodiment, detector means 30 can be placed adjacent the conveyor 19, as for example beneath conveyor 16, so that the conveyor will operate only when the weight of an article is detected on conveyor 16 adjacent conveyor 19. It is noted that in either case, conveyor 19 moves only one have revolution at a time, in accordance with separate signals received by the detecting head from successive articles.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A conveyor system for transporting articles to preselected destinations, which articles have means thereon providing destination address information, said conveyor system including a generally horizontal endless conveyor defining first and second horizontal conveyor flights, a plurality of cooperating generally vertically extending endless conveyors located above said horizontal conveyor with one pair of cooperating flights of said vertically extending conveyors being located adjacent each other over said first horizontal conveyor flight and moving upwardly with respect thereto and another pair of cooperating flights of said vertically extending conveyors being located adjacent each other over said second horizontal conveyor flight and moving downwardly with respect thereto, a selectively operative lifting conveyor located adjacent said first horizontal conveyor flight and having one flight thereof moving vertically between said first horizontal conveyor flight and a position adjacent said one pair of cooperating flights of said vertically extending conveyor, means on said lifting conveyor for engaging an article on said first horizontal conveyor flight to lift said article from said first horizontal conveyor flight to said position adjacent said one pair of cooperating flights wherein the article is engaged between said flights and moved upwardly therebetween, means located between said first and second horizontal conveyor flights for selectively diverting an article held between and moving downwardly with said another pair of flights between said first and second horizontal conveyor flights, and means responsive to the address information on articles transported in said conveyor system for selectively operating said diverting means.

2. The conveyor system as defined in claim 1 wherein said means responsive to the address information on said articles selectively operates said lifting conveyor in response to said address information.

3. The conveyor system as defined in claim 1 wherein said lifting conveyor is operated in response to the presence of an article on said first horizontal conveyor flight, adjacent the lifting conveyor.

4. The conveyor as defined in claim 2 wherein said lifting conveyor comprises a pair of spaced endless chains having lifting platforms connected therebetween and extending outwardly therefrom.

5. The conveyor system as defined in claim 2 wherein said diverting means comprises a guide plate pivotally mounted on a horizontal axis between said first and second conveyor flights, said axis extending generally parallel to said flights.

6. The conveyor system as defined in claim 5 including means for tensioning said vertically extending conveyor flights.

7. The conveyor system as defined in claim 5 wherein said plurality of vertically extending conveyors comprises a first centrally located vertically extending conveyor having a downwardly moving flight and an upwardly moving flight, a second vertically extending conveyor having a downwardly moving flight located adjacent the downwardly moving flight of said first vertically extending conveyor and cooperating therewith to define said another pair of cooperating flights for holding said articles therebetween, and a third vertically extending conveyor having an upwardly moving flight located adjacent the upwardly moving flight of said first vertically extending conveyor and cooperating therewith to define said one pair of cooperating flights for holding said articles therebetween.

8. The conveyor system as defined in claim 7 including means for tensioning the flights of said second and third vertically extending conveyors.

* * * * *